G. H. SPAULDING.
GRAIN BINDER.
No. 262,492. Patented Aug. 8, 1882.
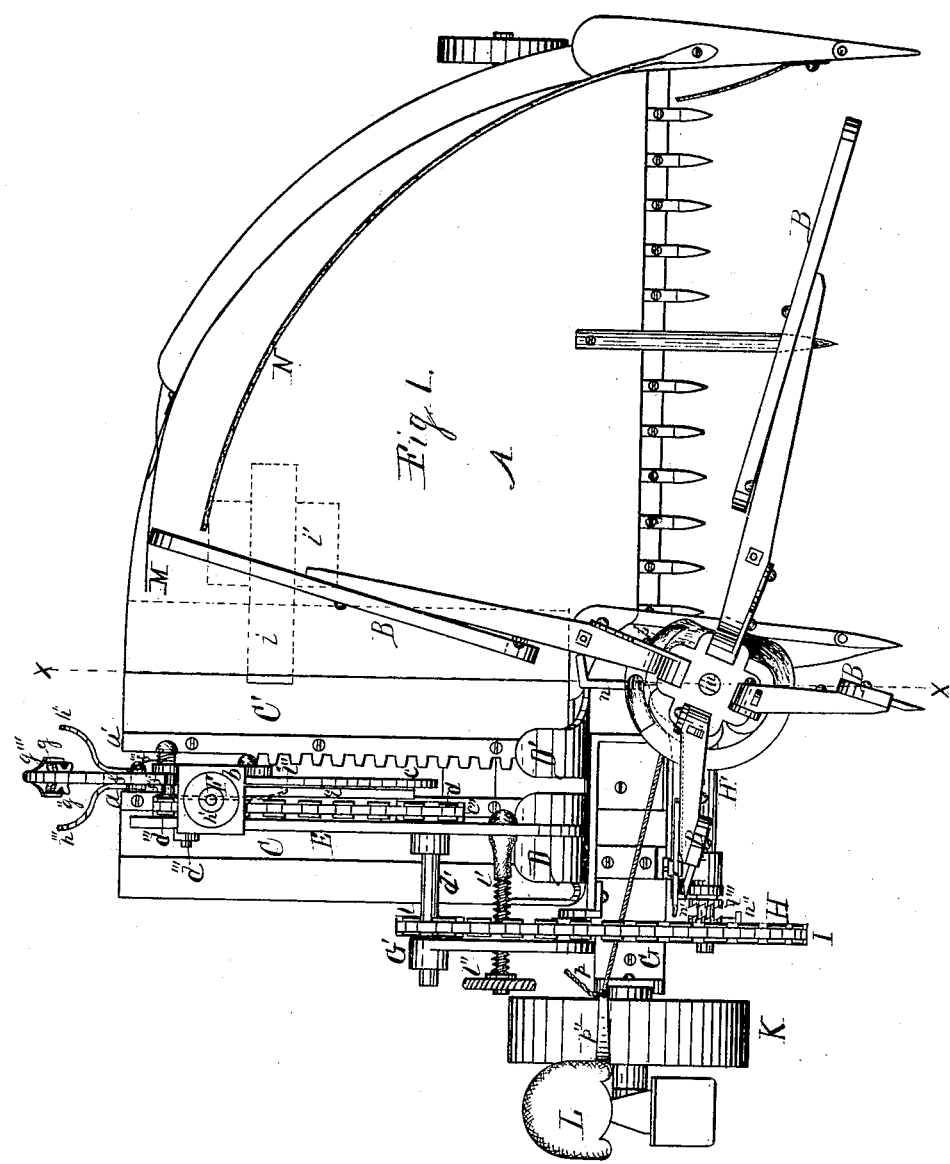

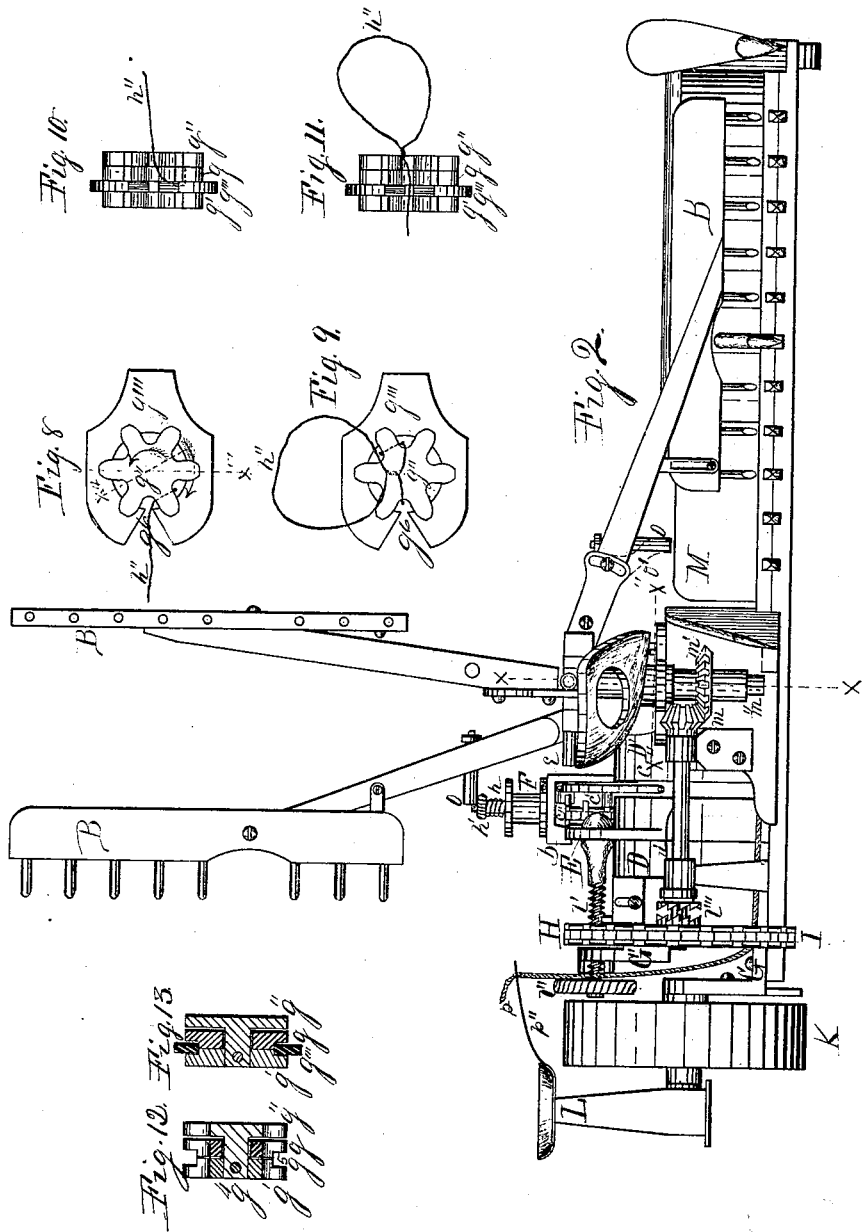
G. H. SPAULDING.
GRAIN BINDER.
No. 262,492.  Patented Aug. 8, 1882.

G. H. SPAULDING.
GRAIN BINDER.
No. 262,492. Patented Aug. 8, 1882.
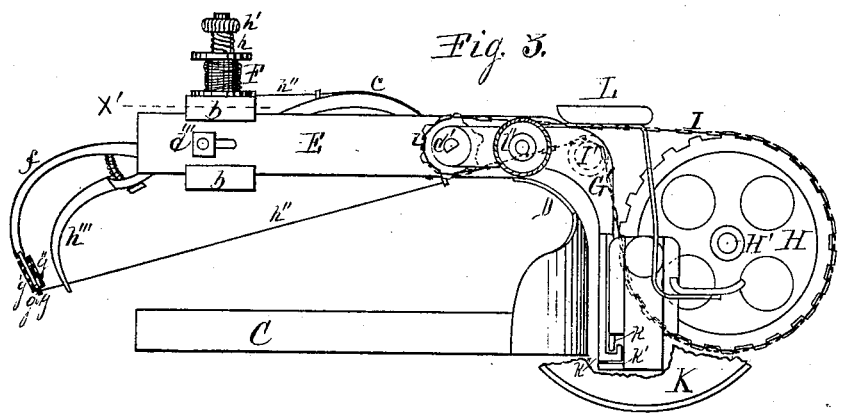
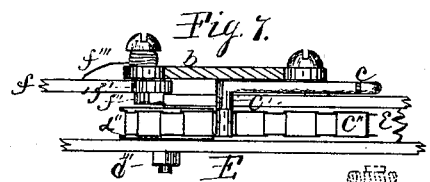
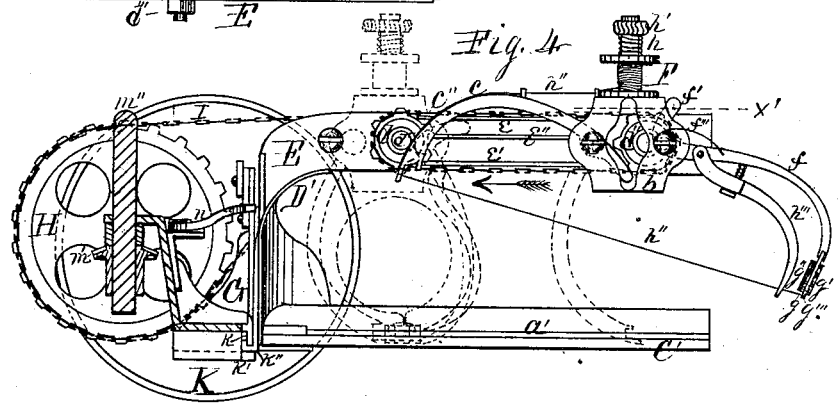
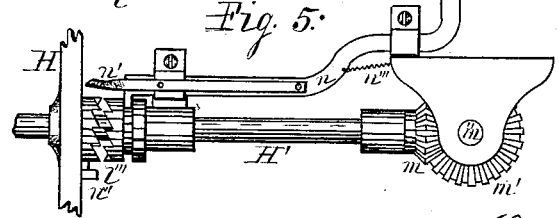
Witnesses.
A. O. Behel
Israel Sovereign
Inventor
George Henry Spaulding
Per Jack Behel
Atty.

UNITED STATES PATENT OFFICE.

GEORGE H. SPAULDING, OF ROCKFORD, ASSIGNOR OF THREE-FOURTHS TO WM. A. KNOWLTON, OF WINNEBAGO COUNTY, AND THE McCORMICK HARVESTING MACHINE COMPANY, OF CHICAGO, ILLINOIS.

GRAIN-BINDER.

SPECIFICATION forming part of Letters Patent No. 262,492, dated August 8, 1882.

Application filed May 11, 1878.

*To all whom it may concern:*

Be it known that I, GEORGE HENRY SPAULDING, of the city of Rockford, in the county of Winnebago and State of Illinois, have invented a new and useful Improvement in Grain-Binding Machines, of which the following is a specification.

This invention relates to that class of grain-binding machines adapted to receive the cut grain as it is delivered from the harvester by a self-rake, and which automatically gathers it into bundles, securely binds them, and when so bound discharges them from the machine without any interference or agency other than the machinery that operates it; and it consists in the construction and arrangement of the parts and devices which will be hereinafter more fully described.

In the drawings, Figure 1 is a plan view of a self-raking harvester with my binding-machine attached. Fig. 2 is a front elevation of the same. Fig. 3 is a side elevation of my improved binding-machine as viewed from the driving-wheel end of the machine, and in which most of the driving-wheel is broken away. Fig. 4 is a side elevation of the same, in which the rake is removed, and as viewed from the grain-wheel end, and partly in section, as cut on dotted lines $x$ in Figs. 1 and 2. Fig. 5 is a plan view on dotted line $x$ of parts connecting my improved binding-machine with the self-rake movement and the shifter operated by the rake-arm to put in motion the gathering and binding machine. Fig. 6 is a view of the shifter from the rear, showing the spring-detent and toothed clutch. Fig. 7 is a plan view, showing the connection of the binding-arms with sliding cross-head and chain-carrying belt, in which the sliding head is cut on dotted lines $x'$, Figs. 3 and 4.

The remaining figures, from 8 to 11, inclusive, show the band securing and cutting device in different positions. Fig. 12 is a transverse section of the band-securing mechanism, cut on dotted line $x'''$, Fig. 8; and Fig. 13 is a transverse section of band twisting, cutting, and holding wheels, cut on dotted line $x^4$, Fig. 8.

The harvester represented in the accompanying drawings is substantially the same as harvesters now in common use, and the self-rake mounted thereon is substantially the same as that known in the trade as the "Johnston" rake, and is of that class in which any one or all of the reel-arms are under the control of the driver, to be employed as rakes to sweep the cut grain from the platform of the harvester, and it receives its motion from the moving parts of the harvester, being connected therewith in any suitable manner.

In the figures, A represents what is known as a "quadrant platform", from which the cut grain is swept by the arm B, when employed as a rake, and delivered onto the binder-platform attached to the delivery end of the quadrant-platform in such a manner that the binding-machine mounted thereon may be adjusted to or from the delivery end of the harvester-platform to adapt the machine to bind long or short grain centrally.

The binding-platform is composed of two parts, C and C', placed in such a manner as to form a slot lengthwise between the two portions, and secured in position by battens secured crosswise to their under sides. $a$ is a metallic plate secured on the upper side and slot-edge of the outer half, C, of the binding-platform, and $a'$ is a metallic plate secured on the upper side and slot-edge of the inner half, C', of the binding-platform. The slot-edge of $a'$ is provided with gear-teeth, forming a toothed rack. The contiguous edges of these metallic plates are grooved on their under sides and overlap the edges of their respective portions of the platform, and form a guideway to receive the plate in which the twisting-wheel revolves. To the forward end of this binding-platform are secured guard-plates D and D', which rise above the platform and curve rearward at their upper ends; and are separated, forming a vertical slot between them, which is a continuation of the slot in the platform.

E is an elevated overhanging crane-like arm, secured at its forward end to the upper curved end of the guard-plate D, and extending rearward over the platform and parallel with the lengthwise slot therein. The edges of this arm furnish trackways on which the vertical cross-head $b$ is fitted to slide lengthwise, held in position by grooved ways which receive the edges of the arm. $c$ is the forward-curved band-carrying and gavel-compressing arm, and is pivoted at the shoulder centrally to the forward edge of the cross-head. Its rear end extends beyond the shoulder-joint, and is provided with a right-angled stud, $c'$, Fig. 7, by which it is pivoted to the chain belt $c''$, which is driven by a sprocket-wheel, $d$, mounted on a shaft, $d'$, fitted to revolve in a bearing in the forward portion of the arm E. This chain belt is carried on an idle sprocket-wheel, $d''$, fitted to revolve on a stud, $d'''$, secured to the rear portion of the arm E, in which it is made lengthwise adjustable by means of a lengthwise slot in the arm to keep the chain belt taut. $e$ and $e'$ are guideways secured to the inner side and near the edges of the arm E, between the sprocket-wheels, to support the chain belt and serve as slideways on which the right-angled stud $c'$ slides, to give it firmness. Instead of the stud sliding on the ways, a roller may be employed to reduce friction.

$f$ is the rear curved band-carrying and gavel-compressing arm, and is pivoted at the shoulder to the rear edge of the cross-head $b$ in such a manner as to permit it to swing into the position represented in dotted lines. The shoulder end of this arm $f$ is constructed with an upward-curving arm, $f'$, provided with a roller, $f''$, which, when the cross-head is moved forward, will be depressed against the rear end of the guide-bar $e$ into the position represented in dotted lines, and the roller $f'''$ will enter and travel in the groove-guideways between the guide-bars $e$ and $e''$ on the inner side of the arm E, which serves to hold the curved arm $f$ rigid during its movements to and fro across the platform. This curved arm, when in its extreme rear position, as represented in solid lines, is held elevated by means of the action of the spring $f''''$.

The band holding, securing, and cutting device is shown enlarged in the several figures from 8 to 13, inclusive, and is composed of the several like-toothed wheels, $g$, $g'$, and $g''$. In this instance the upper toothed wheel, $g''$, is produced with a stud-journal, $g^4$, projecting from the center of its under face. The center toothed wheel, $g$, is fitted to receive the stud-journal $g^4$ in a manner capable of a rotary movement thereon. The under toothed wheel, $g'$, is fitted to receive the under end of the stud-journal $g^4$ snugly and in such a manner as to permit the center wheel, $g$, to revolve between the two outer wheels, $g'$ and $g''$; and in this instance this under wheel, $g'$, is fixed to its shaft by means of a pin passed transversely through the parts.

At $g^5$ is represented an annular groove formed between the under and center toothed gear-wheels, in this instance by reducing the upper surface of the teeth of the under wheel, $g'$, and the under surface of the teeth of the center wheel, $g$, producing a groove of proper dimensions to receive the bearing-plate $g'''$. This reduction of the contiguous faces of the under and center gear-toothed wheels forms a boss or hub-like journal bearing on the wheels, which enters a bearing formed in the bearing-plate $g'''$ for its reception. The bearing-plate $g'''$ is properly bored to receive the hub-journal of the under and center wheels in such a manner as to permit them to revolve therein freely. The forward edge of the bearing-plate $g'''$ is provided with a flaring slot, $g^6$, of V form, opening into the bearing-circle formed in the plate. This bearing-plate $g'''$ is securely fixed to the free end of the band-carrying arm $f$, and is fitted to slide lengthwise to and fro in the grooves in the slot-edges of the binder-platform in such a manner that the teeth of the center wheel, $g$, will engage the teeth of the toothed rack on the slot-edge $a'$ of the binder-platform and cause the twisting-wheel to revolve in its bearing in the bearing-plate $g'''$ during its movement in contact with the toothed rack.

The binding material, which in this instance is annealed wire of proper size, is wound on a spool, F, which is mounted on the cross-head, and is held in position by a spiral spring, $h$, and screw thumb-nut $h'$, by means of which the tension on the binding material may be regulated. From the spool the binding-wire $h''$ is passed through guide-eyes on the cross-head, crowning portion, and extreme point of the carrying and compressing arm $c$, from whence it is carried and passed through the slotted forward end of the bearing-plate, with its free end upward, into and between the teeth of the several wheels forming the twisting-wheel. The center wheel and the upper and lower wheels are then made to move on their axial supports in opposite directions, as indicated by the arrows on Fig. 8, the distance of one tooth and one space between the teeth, which movement will operate to cut the wire between the passing edges of the teeth of the upper and center wheels; and this movement of the wheels will bend the wire between the contiguous faces of the teeth of the center and under wheels around the tooth of the center wheel as a belay-pin, and will be carried upward between the teeth of the center and upper wheels. In this position the ends of the wire will be firmly held in the twisting-wheel, and will be taut between the extreme ends of the band-carrying and gavel compressing arms $c$ and $f$ a sufficient distance above the binding-platform to admit the grain carried by the rake from the harvester-platform onto the binder-platform.

In the dotted lines at $i''$ is represented a spring-detent secured to the inner slot-edge of the outer half, C, of the binder-platform in such a manner that in the forward movement of the twister in the slotted platform its free end will be depressed by the teeth of the under wheel, and in the return or rearward movement of the twister its free end will engage the teeth of the under wheel, which, in connection with the toothed rack engaging the teeth of the center wheel on the opposite side from the spring, will cause the center and outer wheels of the twister to move on their axial centers in opposite directions, as indicated by the arrows in Fig. 8, which will cut, bend, and hold the wire, as hereinbefore described; and the herein-described bending of the wire round the tooth of the center wheel, between the upper face of the teeth of the under wheel and the under face of the teeth of the center wheel, and upward between the teeth of the center and upper wheels, operates to hold the wheels with sufficient force to cause them to rotate in unison, except at the point of contact with the free end of the spring in their rearward movement.

$h'''$ is a forked gathering and compressing arm, pivoted at its upper end to the band-carrying-arm $f$, and is held in advance of the arm $f$ by spring action, which will permit it to yield, to adapt the machine to bind bundles differing in size, and it also serves to gather the grain from the rear of the platform. This binding-machine is connected to the harvester toward its rear end by a slip device consisting of a bar, $i$, represented in dotted lines secured to its under side, and adapted to slide to and from the harvester-platform in a guideway, $i'$, secured to its under side. The forward end of the binding-machine is connected to the rear edge of the cutter-bar in such a manner as to slide lengthwise thereon in grooved ways formed by the hooking-bar $k$, secured to the upper side of the cutter-bar, and the bed-plate $k'$, secured to its under side, to receive the hooking lower end of the sliding plate $k''$, which is secured to the forward end of the binding-machine. This, in connection with the sliding device described as employed at the rear portion of the platform, furnishes the sliding devices which connect the binding-machine with the harvester.

G is a bracket, with foot-plate secured to the upper side of the driving-wheel end of the cutter-bar. From this bracket rises a short crane-like arm, G', of substantially the same form as the forward portion of the arm E, with which it is placed parallel, but some distance from it toward the driving-wheel end of the machine.

$l$ is a sprocket-wheel, the journal of which is fitted to revolve in the rear end of arm G', and its center is fitted to receive the flattened portion of shaft $d'$ of sprocket-wheel $d$ in such a manner as to permit the shaft to slide lengthwise through the wheel $l$ and to cause the sprocket-wheels $d$ and $l$ to revolve with the shaft.

$l'$ is a shaft screw-threaded into the crane-like arm G' and one of its ends fitted to revolve in the arm E. Its free end is provided with a hand-wheel, $l''$, by means of which the screw-threaded shaft may be turned in either direction, which will carry with it the binding-machine to or from the delivery end of the harvester-platform, to adapt the machine to bind long or short grain centrally.

H is the main driving sprocket-wheel, provided with a center saw-toothed clutch, and is mounted loosely on the shaft H' in such a manner that the saw-toothed clutch will engage a similar saw-toothed clutch, $l'''$, feathered to slide lengthwise on the shaft. The shaft H', with the sprocket-wheel and clutches mounted thereon, is fitted to revolve in bracket-bearings which rise from the upper forward face of the cutter-bar, and the end of the shaft opposite to the sprocket-wheel is fitted with a beveled-toothed gear-wheel, $m$, the teeth of which engage the teeth of a beveled-toothed gear-wheel, $m'$, secured to the vertical shaft $m''$ on which the reel and rake arms are mounted.

I represents a chain-belt, the links of which are fitted to engage the teeth of the driving sprocket-wheel H in front of the cutter-bar, and extending rearward over the cutter-bar, at right angles thereto, and its links engage the teeth of the sprocket-wheel $l$ in rear of the cutter-bar to impart motion to the binder from the movement of the rake.

I' is a carrying and tightening pulley, made vertically adjustable by a slotted support and clamping-screws, and is employed in connection with the driving chain-belt I, and by it the belt is kept taut. Instead of this chain-belt movement, it is evident that shafting with properly-arranged gear-wheels may be employed to connect the rake movement in front of the cutter-bar with the binder in rear thereof.

$n$ is a shifting bar fitted to slide lengthwise in guide-loops, and its bent end enters the annular groove in the sliding saw-toothed clutch $l'''$.

$n'$ is a spring-detent which serves to hold the clutches in contact.

$n''$ is a tripping-stud projecting from the face of the sprocket-wheel H, which in each revolution of the wheel will disengage the spring-detent, and the action of the spiral spring $n'''$ will disengage the toothed clutch. The reel-arms are provided with depending studs $o$, which, when the arms are employed as rakes to sweep the cut grain from the quadrant-platform into the binder, will come in contact with the free end of the shifting-bar and will throw the toothed clutch into engagement and put in motion the binding devices. Instead of the studs $o$ depending from the reel-arms, the hinged metallic portions may be enlarged, as shown in dotted lines at $o'$, which construction would not be affected by the adjustment of the reel-arms.

K represents the driving-wheel of the harvester, fitted to revolve on an axle-arm connected with the harvester-frame.

L is the driver's seat and foot-board, secured to the outer end of the axle-arm.

$p$ is a cord or chain connected at its inner end to the spring detent-lever connected with the spring-fly or gateway $p'$ in the cam-track of the reel-arms, employed to drop any one of the reel-arms to the platform for the purpose of causing it to act as a rake, which is accomplished by the driver pulling on the free end of the cord or chain which is passed through the outer end of the arm $p''$, secured to the seat within easy reach. The rear portion of the vertical rim on the outer edge of the quadrant platform is provided with a spring-fly, M, employed to direct the grain toward the head of the binder. The curved wire N, supported above the platform and inner edge of the curved outer rim thereof, is employed to assist in conducting the grain to the head of the binder. In my improved automatic binding-machine and self-raking harvester the self-rake is mounted on the harvester in advance of the cutter-bar, and the automatic binding-machine is mounted on the harvester in rear of the cutter-bar. This arrangement enables me to produce a well-balanced machine.

My improved combined machine is drawn forward into the standing grain, which is cut and deposited on the platform in the usual manner, from which it is swept by the revolving reel-arms, when employed as rakes, into the binding-machine attached to its delivery end. In this operation the depending stud $o$ in the rake-arm or its equivalent will come in contact with the free end of the shipping-bar, and will connect the saw-toothed clutches, which will set in motion the binding devices, causing the vertical cross-head $b$ to move forward. This movement will depress the rear band-carrying arm $f$ and the forked gathering-arms $h'''$ and cause the twisting-wheel to enter and travel with the teeth of the center-wheel in connection with the toothed rack, and will carry the cut grain to the forward end of the binder-platform, at which point the forward band-carrying arm, $c$, will descend, embracing the gavel and carrying with it the binding-wire round it and into the twisting-wheel, when the gavel embraced by the band-carrying and gavel-compressing arms and encircled by the binding-wire will be carried rearward by the backward movement of the vertical cross-head $b$, which will cause the twisting-wheel in contact with the toothed rack to revolve and secure the band around the bundle by twisting the wires together between the twisting-wheel and the gavel. This twisting will continue until the teeth of the wheel $g'$ of the twisting-wheel come in contact with the spring-detent $i''$, at which point the wire encircling the bound bundle will be cut between the contiguous faces of the upper and middle wheels of the twister, and the end of the wire from which the bundle was cut will be held in the twister, as above described. The further backward movement of the binding devices will permit the rear binding-arm to rise, and the bound bundle carried to the rear end of the platform will drop to the ground, and the forward movement of the machine will remove it entirely from the platform. The forward binding-arm will then be made to rise and hold the binding-wire taut between the extreme ends of the binding-arms suspended above the platform. At this time the driving sprocket-wheel H will have made one complete revolution, and the tripping-stud $n''$ will have disengaged the spring-detent $n'$, and consequently the saw-toothed clutch and the binding devices will be stopped to await the reception of another gavel to be delivered by the rake, when the binding will be repeated, as above described, at the reception of each gavel.

The construction and arrangement of the twister and the toothed rack are such that in the movement of the twister in connection with the toothed rack the opposite sides of the twister will be alternately presented forward for the reception of the binding-wire, which will be placed vertically between the teeth of the several wheels of the twister on its forward side when in its forward position in the binder-platform; and the wire thus placed in the twister will assist in holding the several wheels to cause them to revolve in unison in the rearward movement of the twister in contact with the toothed rack, which movement will operate to twist the binding-wire between the twister and the bundle over the twisting-wheel.

From the foregoing it will be noticed that the movements of the binder are imparted to it from the movement of the rake, and are in unison therewith; and in this instance the movements of the rake and binder are so timed as to be capable of binding a bundle as delivered to it by every other reel-arm, or any other number above every other arm; but this may be so changed, if desired, as to bind a bundle for each arm or any other number.

I claim as my invention—

1. The combination, with a quadrant-shaped platform, of a wire or rod secured to its forward portion and extending rearward in inward inclination from the curved outer rim of the platform, the rear portion of the wire or rod being practically concentric with the corresponding portion of the platform-rim, substantially as set forth.

2. The combination, with a quadrant-shaped platform, of a wire or rod secured to its forward portion and extending rearward in inward inclination from the outer rim of the platform, the rear portion of said wire or rod extending beyond the curved outer rim of the platform, and being practically concentric therewith, substantially as set forth.

3. The combination, with a binder-platform having a single-rack groove, of a band-carrying arm provided with three concentric wheels, the two outer wheels being rigidly secured together and the middle wheel being free, the side of the groove opposite to the rack being provided with a spring-detent whose free end projects inwardly, substantially as set forth.

4. The combination, with a band-carrying arm provided with a slotted bearing-plate, and a binder-platform whose groove has a rack formed on one side thereof and a spring-detent secured to the opposite side, with its free end projecting inward, of three concentric wheels, the two outer ones being rigidly secured together and the middle one being free, the middle wheel and one outer wheel being provided with annular grooves in which the bearing-plate fits, substantially as set forth.

5. The combination, with a binder-platform whose groove has one side provided with a spring-detent whose free end projects inwardly, of a band-carrying arm provided with a plate and three concentric wheels connected to the latter, the two outer wheels being rigidly secured together and the middle wheel being free, one outer wheel and the middle wheel being grooved to receive the bearing-circle of the plate, said plate being provided with a V-shaped slot opening into said bearing-circle, substantially as set forth.

6. The combination, with a binder-platform provided with an upright, and a harvester-platform provided with an upright on the driving-wheel end of the cutter-bar, of a screw-shaft which connects said two uprights and maintains both platforms in desired relative position, substantially as set forth.

7. The combination, with a harvester-platform and a binder-platform, having their under sides connected together by guides and guideways, of an upright secured to the binder-platform, an upright secured to the harvester-platform, and an adjusting device which connects said two uprights, substantially as set forth.

8. The combination, with an upright shaft carrying the rake, a horizontal shaft gearing therewith, a loose wheel on the latter shaft, and clutch mechanism operated by the rake-arms, of a belt running to the binder-platform from the loose wheel, a vehicle provided with band-carrying arms and traveling on an elevated track, and a shaft which connects the vehicle-actuating belt and the loose wheel, substantially as set forth.

9. The combination, with an upright shaft carrying the rake, a horizontal shaft gearing therewith, and a belt-wheel loosely mounted on the latter shaft, of a sliding bar adapted by engagement with the rake-arms to throw said wheel in clutch with the shaft, a spring which tends to retract the bar, and a spring-detent adapted by engagement with a stud on the belt-wheel to release said clutch engagement, substantially as set forth.

10. The combination, with an upright shaft carrying the rake, a horizontal shaft gearing therewith, a loose wheel mounted on the latter shaft, and rake arms provided with depending studs, of a sliding bar adapted by engagement with the studs to throw the wheel in clutch with its shaft, a spring which tends to retract the bar, and a spring-detent which releases the clutch engagement by engaging with a stud on the wheel, together with a belt which passes to the binder-platform, a vehicle traveling on an elevated track and provided with band-carrying arms, and a shaft which connects the vehicle-actuating belt and the loose-wheel belt, substantially as set forth.

11. The combination, with the longitudinally-slotted platform and the elevated crane-like arm horizontally overhanging the same, of a vehicle to which the forward band-carrying arm is pivoted, and by which it is moved in the platform-slot, said band-carrying arm having its upper extremity pivoted to the belt or chain which actuates said vehicle, substantially as set forth.

12. The combination, with a binder-platform formed with a longitudinal slot, in which the band-carrying arms work, and an elevated trackway, of a vehicle which is moved over the latter by a suitable belt or chain, together with a forward band-carrying arm adapted to have suitable movement imparted thereto by direct pivotal connection respectively with said vehicle and belt or chain, substantially as set forth.

13. The combination, with a binder-platform formed with a longitudinal slot, in which the band-carrying arms work, and an elevated trackway, of a vehicle actuated in movement over the latter by a suitable belt or chain, together with a band-carrying arm which is directly connected with both said vehicle and belt or chain, substantially as set forth.

14. The combination, with the chain operating the moving vehicle on the elevated trackway, intermediate shaft provided with sprocket-wheels on both ends, and connecting chain belt, of the main sprocket-wheel loosely mounted on the front horizontal shaft, which latter is rotated by bevel-gearing with the vertical shaft supporting the reel and rake arms, together with shaft clutch mechanism and shifting bar adapted to be actuated by engagement with studs formed on said reel and rake arms, substantially as set forth.

GEORGE HENRY SPAULDING.

Witnesses:
PHILIP C. HOLLAND,
J. G. MANLOVE.